US008506399B2

(12) United States Patent
Pryzby et al.

(10) Patent No.: US 8,506,399 B2
(45) Date of Patent: Aug. 13, 2013

(54) CONFIGURING AND CONTROLLING WAGERING GAME AUDIO

(75) Inventors: Eric M. Pryzby, Skokie, IL (US); Steven J. Zoloto, Highland Park, IL (US); Alfred Thomas, Las Vegas, NV (US)

(73) Assignee: WMS Gaming, Inc., Waukegan, IL (US)

( * ) Notice: Subject to any disclaimer, the term of this patent is extended or adjusted under 35 U.S.C. 154(b) by 226 days.

(21) Appl. No.: 12/895,783

(22) Filed: Sep. 30, 2010

(65) Prior Publication Data

US 2011/0092288 A1 Apr. 21, 2011

Related U.S. Application Data

(60) Provisional application No. 61/247,208, filed on Sep. 30, 2009.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl.
USPC .......... 463/35

(58) Field of Classification Search
USPC .......... 463/35
See application file for complete search history.

(56) References Cited

U.S. PATENT DOCUMENTS

| | | | | |
|---|---|---|---|---|
| 6,110,041 | A | 8/2000 | Walker et al. | |
| 6,293,866 | B1 | 9/2001 | Walker et al. | |
| 6,848,996 | B2 | 2/2005 | Hecht et al. | |
| 6,902,481 | B2 | 6/2005 | Breckner et al. | |
| 7,033,276 | B2 | 4/2006 | Walker et al. | |
| 7,040,987 | B2 | 5/2006 | Walker et al. | |
| 7,355,112 | B2 | 4/2008 | Laakso et al. | |
| 7,364,508 | B2 | 4/2008 | Loose et al. | |
| 7,367,886 | B2 | 5/2008 | Loose et al. | |
| 7,479,063 | B2 | 1/2009 | Pryzby et al. | |
| 2002/0142825 | A1 | 10/2002 | Lark et al. | |
| 2003/0073489 | A1 | 4/2003 | Hecht et al. | |
| 2005/0043090 | A1 | 2/2005 | Pryzby et al. | |
| 2005/0060759 | A1 | 3/2005 | Rowe et al. | |
| 2005/0277469 | A1 | 12/2005 | Pryzby et al. | |
| 2006/0009285 | A1 * | 1/2006 | Pryzby et al. | 463/30 |
| 2006/0068909 | A1 | 3/2006 | Pryzby et al. | |

(Continued)

FOREIGN PATENT DOCUMENTS

| | | |
|---|---|---|
| WO | WO2004025583 | 3/2004 |
| WO | WO2005027059 | 3/2005 |

(Continued)

*Primary Examiner* — William M. Brewster
(74) *Attorney, Agent, or Firm* — DeLizio Gilliam, PLLC

(57) ABSTRACT

A wagering game system and its operations are described herein. In embodiments, the operations can include determining an occurrence of an application event for an application that runs in association with a wagering game machine. The operations can further include accessing a custom sound source that includes customized sounds presentable separately from a soundtrack for the application, during a wagering game session on the wagering game machine. The operations can further include determining a custom sound, from the custom sound source, that relates to the application event and determining custom-sound presentation instructions associated with the custom sound. The operations can further include presenting the custom sound on sound production devices associated with the wagering game machine during the application event according to the custom-sound presentation instructions.

25 Claims, 10 Drawing Sheets

(56) References Cited

U.S. PATENT DOCUMENTS

| | | | |
|---|---|---|---|
| 2006/0252523 | A1 | 11/2006 | Walker et al. |
| 2007/0015570 | A1 | 1/2007 | Pryzby |
| 2007/0135213 | A1 | 6/2007 | Walker et al. |
| 2008/0064486 | A1 | 3/2008 | Pryzby et al. |
| 2008/0076548 | A1 | 3/2008 | Paulsen |
| 2008/0096666 | A1 | 4/2008 | Pryzby et al. |
| 2008/0139284 | A1 | 6/2008 | Pryzby et al. |
| 2008/0176654 | A1 | 7/2008 | Loose et al. |
| 2009/0325714 | A1 | 12/2009 | Kelly et al. |
| 2009/0325715 | A1 | 12/2009 | Kelly et al. |
| 2010/0093425 | A1 | 4/2010 | Tsuchiya et al. |

FOREIGN PATENT DOCUMENTS

| | | |
|---|---|---|
| WO | WO2008057538 | 5/2008 |
| WO | WO2008066686 | 6/2008 |
| WO | WO2009009269 | 1/2009 |

* cited by examiner

CONFIGURING AND CONTROLLING WAGERING GAME AUDIO

RELATED APPLICATIONS

This application claims the priority benefit of U.S. Provisional Application Ser. No. 61/247,208 filed Sep. 30, 2009.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2010, WMS Gaming, Inc.

TECHNICAL FIELD

Embodiments of the inventive subject matter relate generally to wagering game systems and networks that, more particularly, configure and control wagering game audio.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE DRAWING(S)

Embodiments are illustrated in the Figures of the accompanying drawings in which.

DESCRIPTION OF ILLUSTRATIVE EMBODIMENTS

Figure 1:
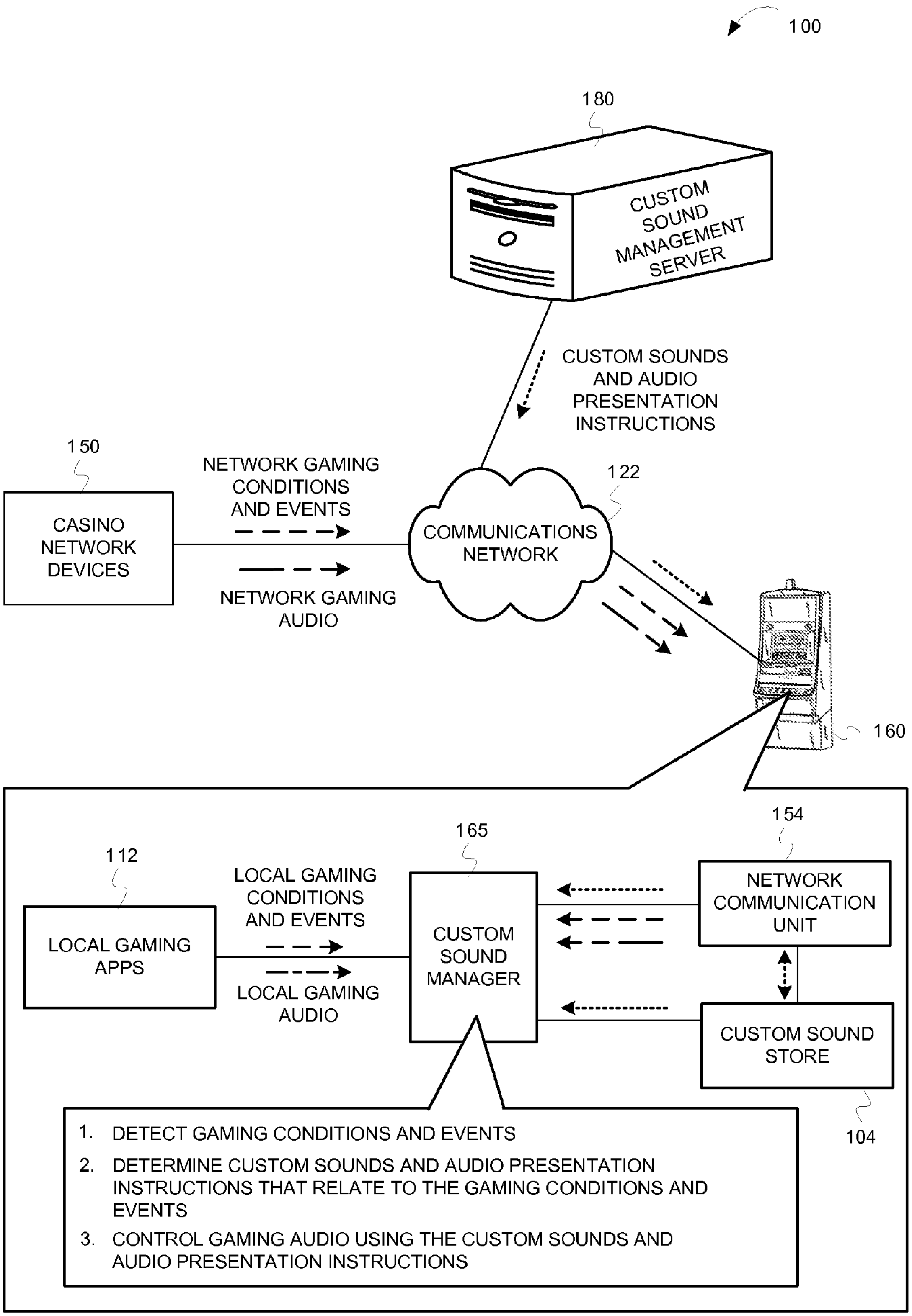
FIG. 1 is an illustration of controlling wagering game application audio using the custom sounds and custom sound presentation instructions, according to some embodiments.

This description of the embodiments is divided into five sections. The first section provides an introduction to embodiments. The second section describes example operating environments while the third section describes example operations performed by some embodiments. The fourth section describes additional example operating environments while the fifth section presents some general comments.

Introduction

This section provides an introduction to some embodiments.

Many computerized wagering game systems have a variety of sound and graphical elements designed to attract and keep a game player's attention, such as sound effects, music, and animation. These game presentation features often include a variety of music, sound effects, and voices presented to complement a visual (e.g., video, computer animated, mechanical, etc.) presentation of the wagering game on a display. Sound presentation, therefore, can greatly enhance a wagering game player's gaming experience.

Some embodiments of the inventive subject matter, describe examples of configuring and controlling wagering game audio in a network wagering venue (e.g., an online casino, a wagering game website, a wagering network, etc.). Embodiments can be presented over any type of communications network (e.g., public or private) that provides access to wagering games, such as a website (e.g., via wide-area-networks, or WANs), a private gaming network (e.g., local-area-networks, or LANs), a file sharing network, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

In some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

FIG. 1 is a conceptual diagram that illustrates an example of controlling wagering game application audio using the custom sounds and custom sound presentation instructions, according to some embodiments. In FIG. 1 a wagering game system ("system") 100 includes a wagering game machine 160 connected to a custom sound management server 180 via a communications network 122. Also included in the system 100 are casino network devices 150 (e.g., a wagering game server, an account server, a community game server, a social network server, etc.) connected to the communications network 122.

The custom sound management server 180 can generate sets of custom sounds and custom sound presentation instructions ("custom sound data") and send the custom sound data to the wagering game machine 160. The wagering game machine 160 can store the custom sound data in a custom sound store 104. A network communication unit 154 can provide the custom sound data to a custom sound manager 165. The casino network devices 150 can provide gaming network audio content and control instructions ("gaming network audio") for gaming network applications (e.g., server-side gaming applications, player tracking applications, maintenance and configuration applications, marketing and advertisement applications, etc.) presented on the wagering game machine 160. The casino network devices 150 can also provide information about network gaming conditions and events that affect the presentation of audio on the wagering game machine 160. The network communication unit 154 can provide the gaming network audio and the information about network gaming conditions and events to the custom sound manager 165. Local gaming applications 112 can provide information about local gaming conditions and events as well as local gaming application audio content and control instructions ("local gaming audio") to the custom sound manager 165. The custom sound manager 165 can receive the local gaming audio, the gaming network audio, the information about network gaming conditions and events, and the information about local gaming conditions and events and compare them to the custom sound presentation instructions from the custom sound data stored in the custom sound store 104. The custom sound manager 165 can refer to the custom sound presentation instructions in the custom sounds data to determine custom sounds to play in place of, or as a supplement to, the local gaming audio or the gaming network audio.

As an example, during a wagering game session a wagering game player plays a wagering game application. The wagering game application can present programmed game sounds on the wagering game machine 160. The custom sound manager 165 can determine that a specific sound plays, such as a congratulatory win sound for a jackpot win. The custom sound manager 165 can refer to the custom sound data to determine that for a jackpot win the custom sound manager 165 can supplement the congratulatory win sound with a custom sound, like a jingle or sound file. The jingle or sound file can include a casino's custom sound branding (e.g., a jingle composed for the casino for marketing purposes or to promote a special event). The wagering game machine 160 can present the jingle from the custom sounds stored in the custom sound data and also present the congratulatory win sound from the wagering game application contemporaneously with each other (e.g., layered with each other, overlapping each other, consecutively one after the other, etc.). The wagering game machine 160 can present the custom sounds from any of its speakers (e.g., game speakers, chair speakers, casino speakers etc.).

In another example, the custom sound manager 165 can present a custom sound instead of the congratulatory win sound. For example, in some embodiments, the custom sound manager 165 can refer to the custom sound data to determine that for a jackpot win the custom sound manager 165 should mute the game's congratulatory sound and replace it with a custom congratulatory sound (e.g., a congratulatory sound that includes casino branding).

In some embodiments, the system 100 can store the custom sound data off the wagering game machine 160. For example, the system 100 can store the custom sound data on the custom sound management server 180 and stream the custom sound data to the network communication unit 154 when needed by the custom sound manager 165. The network communication unit 154 can receive the streamed custom sound data and provide it directly to the custom sound manager 165. In other embodiments, the system 100 can store the custom sound data on the wagering game machine 160. For example, the network communication unit 154 can periodically receive the custom sound data before the custom sound manager 165 needs it, and the network communication unit 154 can store the custom sound data on the custom sound store 104. The custom sound manager 165 can then request the custom sound data directly from the custom sound store 104 when needed. In other embodiments, the system 100 can store part of the custom sound data on the wagering game machine 160 and part of the custom sound data off the wagering game machine 160. For example, the system 100 can store the custom sounds on the custom sound management server 180 or on some other network device, and can store the custom sound presentation instructions on the wagering game machine 160, or vice versa. In some embodiments, the custom sounds can be part of a sound set. The system 100 can swap sound sets in and out of custom sound data without having to reconfigure all of the custom sound instructions (e.g., see further below for discussion of custom sound templates that use custom sound sets). In other embodiments, the system 100 can also provide custom sound data to peripheral devices and audio delivery systems associated with the wagering game machine 160 and/or associated with other parts of the system 100.

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures.

Wagering Game System Architecture

Figure 2:
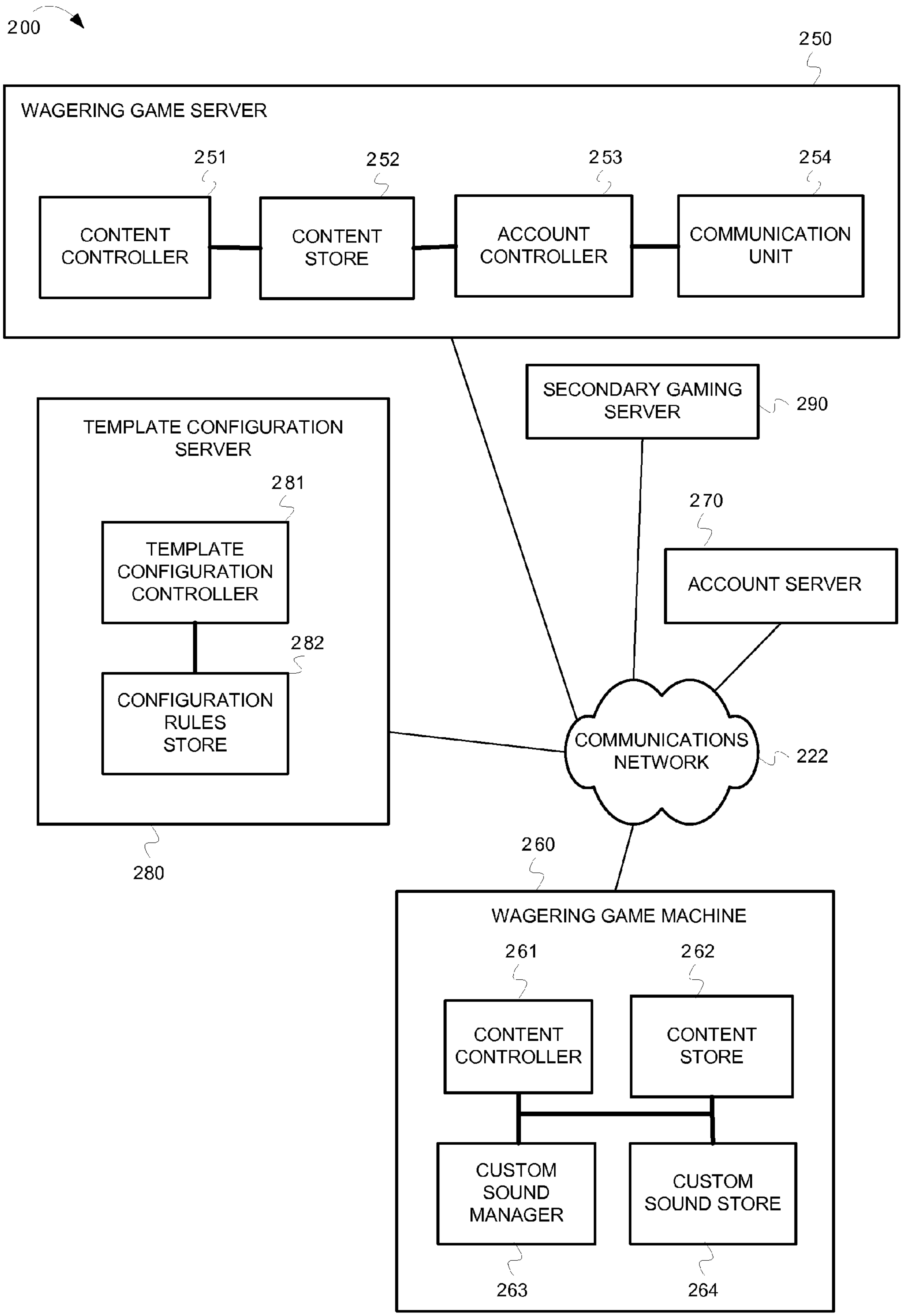
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks and social networking networks. The account server 270 can store wagering game player account information, such as account settings and/or preferences (e.g., player preferences regarding custom sound presentations), player profile data (e.g., name, avatar, screen name, etc.), and other information for a player's account (e.g., financial information, account identification numbers, virtual assets, social contact information, etc.). The account server 270 can contain lists of social contacts referenced by a player account. The account server 270 can also provide auditing capabilities, according to regulatory rules. The account server 270 can also track performance of players, machines, and servers.

The wagering game system architecture 200 can also include a wagering game server 250 configured to control wagering game content, provide random numbers, and communicate wagering game information, account information, and other information to and from a wagering game machine 260. The wagering game server 250 can include a content controller 251 configured to manage and control content for the presentation of content on a wagering game machine 260. For example, the content controller 251 can generate game results (e.g., win/loss values), including win amounts, for games played on the wagering game machine 260. The content controller 251 can communicate the game results to the wagering game machine 260. The content controller 251 can also generate random numbers and provide them to the wagering game machine 260 so that the wagering game machine 260 can generate game results. The wagering game server 250 can also include a content store 252 configured to contain content to present on the wagering game machine 260. The wagering game server 250 can also include an account manager 253 configured to control information related to player accounts. For example, the account manager 253 can communicate wager amounts, game results amounts (e.g., win amounts), bonus game amounts, etc., to the account server 270. The wagering game server 250 can also include a communication unit 254 configured to communicate information to the wagering game machine 260 and to communicate with other systems, devices and networks.

The wagering game system architecture 200 can also include the wagering game machine 260 configured to present wagering games and receive and transmit information to configure and control wagering game audio. The wagering game machine 260 can include a content controller 261 configured to manage and control content and the presentation of content on the wagering game machine 260. The wagering game machine 260 can also include a content store 262 configured to contain content to present on the wagering game machine 260. The wagering game machine 260 can also include a custom sound manager 263 configured to detect gaming conditions and events, determine custom sound content and custom sound presentation instructions that relate to the gaming conditions and events, and control gaming audio using the custom sound content and custom sound presentation instructions. The wagering game machine 260 can also include a custom sound store 264 configured to store custom sound sets and custom sound templates that include custom sound content and custom sound presentation instructions that relate to gaming conditions and events.

The wagering game system architecture 200 can also include a template configuration server 280 configured to process and control information to configure and control custom sound sources. The template configuration server 280 can include a template configuration controller 281 configured to control the generation and configuration of custom sound templates. The template configuration controller 281 can create custom sound templates, configure the custom sound templates with custom sound rules, and control instructions that specify conditions or events in which to present custom sounds. The template configuration controller 281 can also present selection controls that an operator can use to select event and condition types and assign custom sound files to the selected events and condition types. The template configuration server 280 can also include a configuration rules store 282 configured to store rules concerning presentation requirements, template configurations, template selection requirements, presentation priority, etc.

The wagering game system architecture 200 can also include a secondary gaming server 290 configured to provide content and control information for secondary games and other secondary content available on a wagering game network (e.g., secondary wagering game content, promotions content, advertising content, player tracking content, web content, etc.). The secondary gaming server 290 can provide "secondary" content, or content for "secondary" games presented on the wagering game machine 260. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments secondary content and control can be passed between applications (e.g., via application protocol interfaces), thus becoming, or falling under the control of, primary content or primary applications, and vice versa.

Each component shown in the wagering game system architecture 200 is shown as a separate and distinct element connected via a communications network 222. However, some functions performed by one component could be performed by other components. For example, the wagering game server 250 can also be configured to perform functions of the custom sound manager 263, the custom sound store 264, and other network elements and/or system devices. Furthermore, the components shown may all be contained in one device, but some, or all, may be included in, or performed by, multiple devices, as in the configurations shown in FIG. 2 or other configurations not shown. For example, the account manager 253 and the communication unit 254 can be included in the wagering game machine 260 instead of, or in addition to, being a part of the wagering game server 250. Further, in some embodiments, the wagering game machine 260 can determine wagering game outcomes, generate random numbers, etc., instead of, or in addition to, the wagering game server 250.

The wagering game machines described herein (e.g., the wagering game machine 260) can take any suitable form, such as floor standing models, handheld mobile units, bar-top models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, wagering game machines and wagering game servers work together such that wagering game machines can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 200 can be implemented as software, hardware, any combination thereof, or other forms of embodiments not listed. For example, any of the network components (e.g., the wagering game machines, servers, etc.) can include hardware and machine-readable storage media including instructions for performing the operations described herein. Machine-readable storage media includes any mechanism that stores information in a form readable by a machine (e.g., a wagering game machine, computer, etc.). For example, tangible machine-readable storage media includes read only memory (ROM), random access memory (RAM), magnetic disk storage media, optical storage media, flash memory machines, etc. In some embodiments, machine-readable signal media can include any media suitable for transmitting software over a network.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments one or more of the operations can be performed in parallel. Moreover, some embodiments can perform more or less than all the operations shown in any flow diagram.

Figure 3:
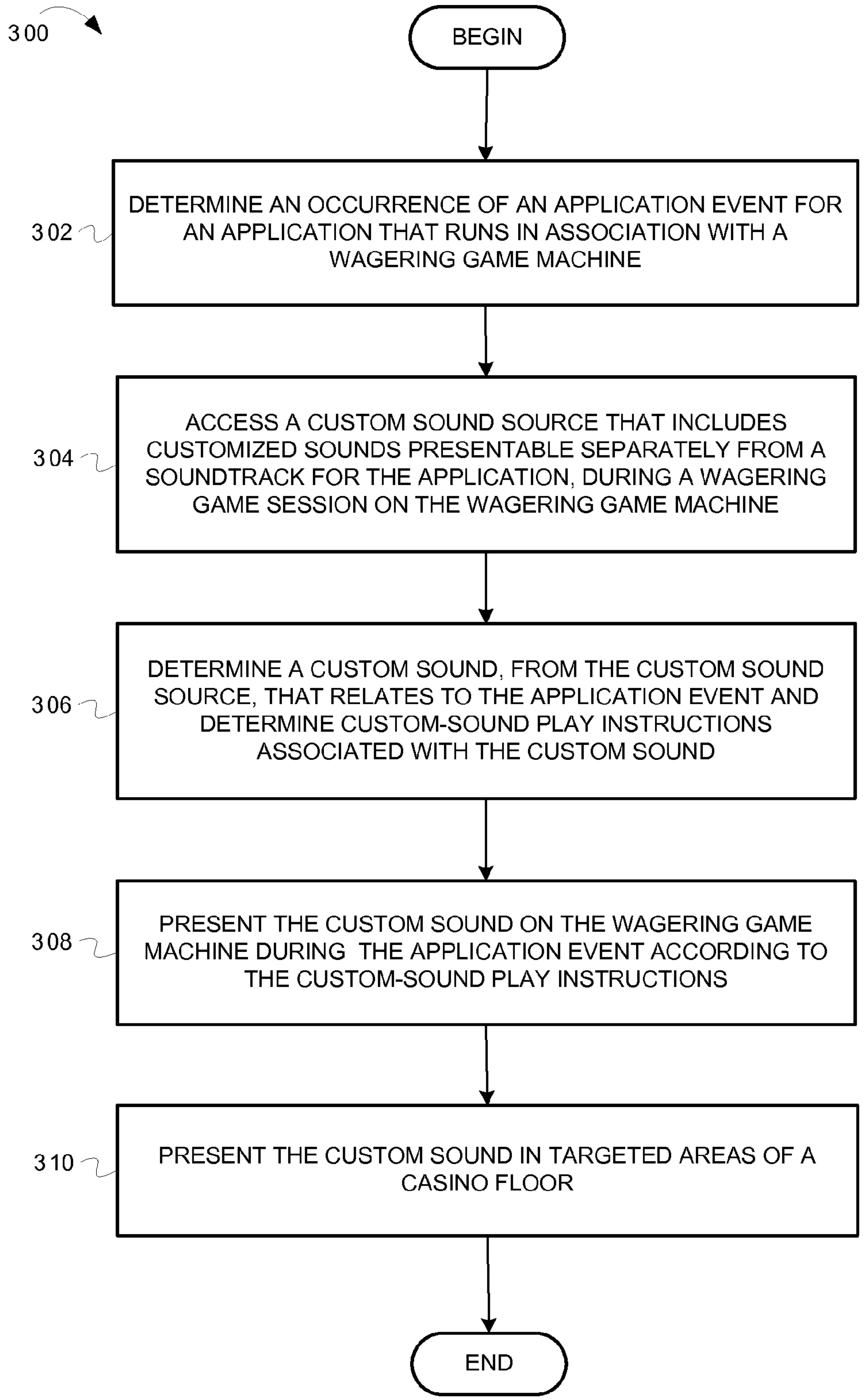
FIG. 3 is a flow diagram 300 illustrating controlling wagering game application audio using the custom sounds and custom sound presentation instructions, according to some embodiments.
Figure 4:
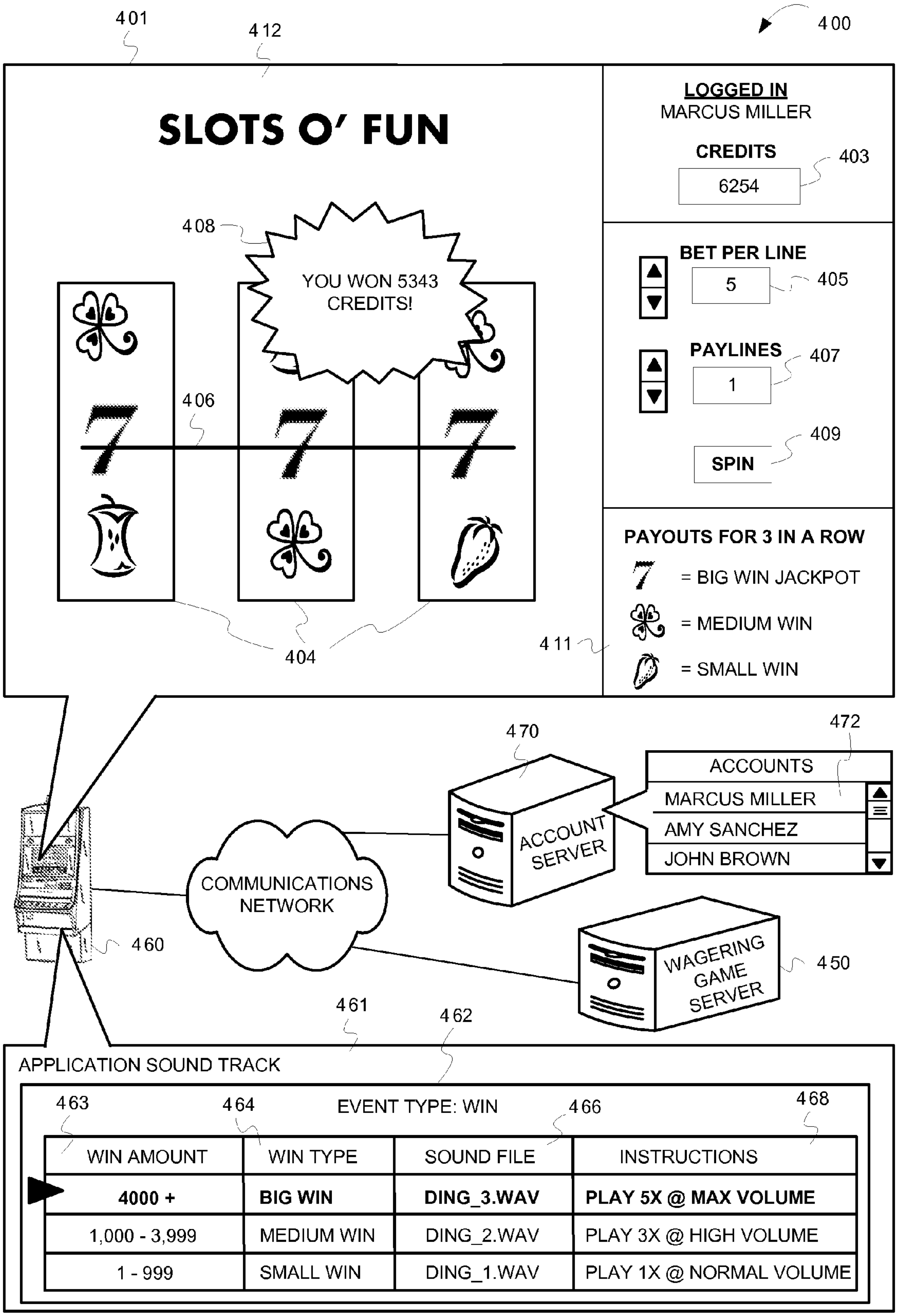
FIG. 4 is an illustration of presenting an application event for a wagering game application, according to some embodiments.

FIG. 3 is a flow diagram ("flow") 300 illustrating controlling wagering game application audio using the custom sounds and custom sound presentation instructions, according to some embodiments. FIGS. 4, 5, 6, and 7 are conceptual diagrams that help illustrate the flow of FIG. 3, according to some embodiments. This description will present FIG. 3 in concert with FIGS. 4, 5, 6 and 7. In FIG. 3, the flow 300 begins at processing block 302, where a wagering game system ("system") determines an occurrence of an application event for an application that runs in association with a wagering game machine. In some embodiments, the application event can be a wagering game event. FIG. 4 is an illustration of presenting an application event for a wagering game application, according to some embodiments. In FIG. 4, a wagering game system ("system") 400 includes a wagering game machine 460, an account server 470, and a wagering game server 450 connected via a communications network 422. The wagering game machine 460 can present a gaming display 401. A player account 472 (i.e., Marcus Miller's player account) can log on to the wagering game machine 460 for a wagering game session. The wagering game machine 460 can present a credit meter 403 associated with the player account 472, which the player account 472 uses to play a wagering game application 412. The wagering game machine 460 can run the wagering game application 412 (i.e., a "Slots O' Fun" wagering game application) within the gaming display 401. The wagering game application 412 can include slot reels 404 that present wagering game results or outcomes. Some outcomes pay out money based on a pay table 411 for the wagering game application 412. The payout amount can also be based on an amount that the player account 472 bets before a given spin of the slot reels 404. The wagering game machine 460 can present game controls (e.g., a bet meter 405, a pay line meter 407, and a spin button 409) that the player account 402 can use during the wagering game session to control the wagering game application 412. In some embodiments, the wagering game application 412 runs locally on the wagering game machine 460 as a client side application. In other embodiments, the wagering game machine 460 can run the wagering game application 412 as a server-side application.

The wagering game application 412 generates application events. For example, the wagering game application 412 can produce a win event for the wagering game application 412. A win event may include several sub events including a spin event, an outcome presentation event, a win-amount determination event, a congratulatory event, etc. For instance, for a spin event the wagering game application 412 determines that the player account 472 sets a bet amount in the bet meter 405, a pay line amount in the pay line meter 407, and activates the spin button 409. For an outcome presentation event, the wagering game application 412 determines and presents a certain slot combination (i.e., combination of reel elements) that can line up on at least one pay line 406. For a win-amount determination event, the wagering game application 412 can refer to the pay table 411, the bet amount indicated in the bet meter 405, and the pay line amount indicated in the pay line meter 407 to produce a win amount. Sometimes more than one pay line can line up simultaneously to produce a cumulative win amount for a single slot reel spin. For a congratulatory event, the wagering game application 412 can present the win amount in a congratulatory message 408. However, although all of the sub-events may be individual events by themselves, they perform in sequence to generate a comprehensive activity or result. Hence, the system 400 can categorize the sub-events together as a single comprehensive event (i.e., as the "win" event).

The wagering game application 412 can include an application soundtrack 461 that includes soundtrack instructions related to specific sounds that are played for certain application events. Soundtrack instructions can have settings for different categories of events. One of the categories can be win events. For example, the application soundtrack 461 refers to win-event soundtrack instructions 462. The win-event soundtrack instructions 462 presents a scale of win events based on win amounts scale values 463 (e.g., in dollars, credits, or some other form of monetary measurement). For each of the win-amount scale values 463, the win-event soundtrack instructions 462 indicate a win type 464, a sound file 466, and audio presentation instructions 468. For instance, the win amount indicated in the congratulatory message 408 indicates an amount over 4000 credits. Thus, the wagering game application 412 determines that the win is a "Big Win" type event. According to the win-event soundtrack instructions 462, for a "Big Win" type event, the wagering game application 412 presents a "Ding_3.wav" sound file. The audio presentation instructions 468 indicate that the sound file should be played five times in a row at a maximum volume level.

The flow 300 continues at processing block 304, where the system accesses a custom sound source that includes customized sounds that can be presented separately from a soundtrack for the application during a wagering game session on the wagering game machine. In some embodiments, the custom sounds can be in various formats including .wav, .mp3, streaming audio, proprietary formats, etc. In some embodiments, the custom sounds can be of various types such as celebrity voices, trademark sounds, live sounds, promotional sounds, game related sounds, etc. For example, during Super Bowl week, the system can play a popular Super Bowl jingle for each big win. In another example, during Cinco de Mayo the system can play Mexican music, or during St. Patrick's Day the system can play Irish vocals, etc. In another example, the system can create a customize sound that promotes a big sporting or musical event. In another example, a host or disk jockey (DJ) can walks around a casino floor with a microphone and present specific live sounds, which the system can incorporate into gaming applications. The DJ may also make commentary from a master screen showing big wins around a casino. The DJ can select areas of the casino to receive the DJ's commentary. The system can project the DJ's commentary to predetermined speakers within the select areas of the casino. In another example, the system can present custom celebratory sounds for big wins, bonuses, jackpots, etc.

Figure 5:
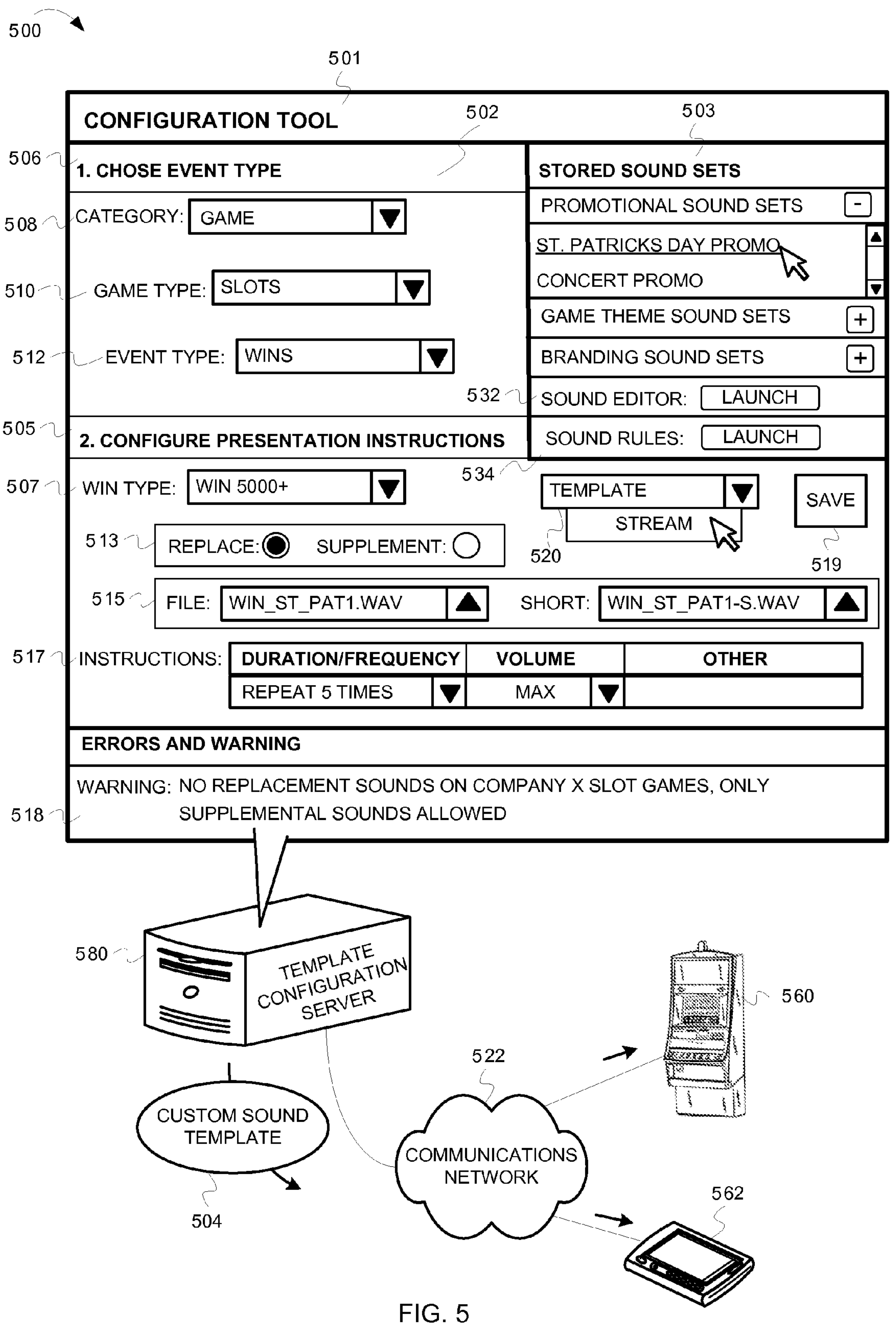
FIG. 5 is an illustration of configuring a custom sound template, according to some embodiments.

In some embodiments, the custom sound source can be a custom sound template stored on a wagering game machine or a network-accessible custom sound store. In some embodiments, the system can present a configuration tool, as shown in FIG. 5, to create and/or modify custom sound templates. In FIG. 5, a wagering game system ("system") 500 can include a template configuration server 580, which can present a custom sound template configuration tool interface ("configuration interface") 501. The configuration interface 501 can include a template editor 502 in which an operator can create, modify, save, delete, or otherwise configure a custom sound template 504. An operator can use the system 500 to name and store the custom sound template 504 on the template configuration server 580 in the form of a configuration file that can be provided to (e.g., downloaded to) one or more wagering game machines 560 and 562 connected to the template configuration server 580 via a communications network 522. The configuration interface 501 can present a stored sound set console to store custom sound sets 503. The sound sets can be sound modules that an operator can use to incorporate into the custom sound template 504.

The configuration interface 501 can also provide an event selection console 506. The event selection console 506 can include controls to select an event category 508. Event categories can relate to player-related conditions, player types, player audio preferences, time of day, date of the year, game priorities, machine locations, player locations, analytics, player inputs, game related activities (e.g., wins, losses, bets, coin-in, bonus games, game themes, etc.), promotional events, prize types, marketing, etc. The event selection console 506 can include controls to further refine the event category 508 with a first sub-type 510 and a second sub-type 512. For example, an operator can select an event category 508 related to games. The operator can then select the first sub type 510, such as slot games, which is a type of the event category 508. The operator can then select the second subtype 512, such as wins, which is a type of the first sub-type 510.

The configuration interface 501 can also include a custom sound presentation instruction console 505. The custom sound presentation instruction console 505 can include controls to select a specific condition or criteria 507 related to the second sub-type 512. For example, the criteria 507 can relate to different win amounts or values. The custom sound presentation instruction console 505 can present custom sound use controls 513 to specify either a replacement or supplemental custom sound file 515 to replace or supplement sounds by gaming applications. The custom sound file 515 can be selected from one or more of the stored custom sound sets 503 that may include sounds related a specific theme. In some embodiments, the custom sound file 515 can be unique sounds generated or acquired by the operator. For example, an operator can use the system 500 to select sounds that incorporate unique branding or distinct custom sound files used for branding (e.g., a casino's jingle, a sponsor's jingle, etc.) into wagering game events. For example, the operator can use the system 500 to incorporate the distinct custom sound file into all game soundtracks for a "jackpot" win sound (e.g., incorporate the "win st_pat1.wav" sound at the beginning or end of a jackpot win sound). The system 500 can incorporate the distinct custom sound into all game tracks for all wagering game applications provided by all of the casino's various wagering game manufacturers or game providers. Thus, according to some embodiments, the operator can generate custom sounds that provide a distinct feel for brands of casinos. In some embodiments, the system 500 can provide sound-editing software 532 that an operator can use to create the unique sounds. The sound editing software 532 can include graphical user interfaces, sound editing features, dropdown menus, etc. Further, the system 500 can present rules configuration software 534 for configuring sound presentation rules related to events and conditions that occur on, and are related to, applications that run on the one or more wagering game machines 560 and 562 or on other wagering game network devices on the communications network 522.

In some embodiments, the custom sound presentation instruction console 505 can also include backup, or secondary sound files, (e.g., short versions of replacement or supplemental sound files) that can be used in place of the custom sound file 515 when conditions require. The custom sound presentation instruction console 505 can further include controls for specifying custom sound presentation instructions 517 about how, when, where, etc. to present the custom sound file 515. Further, the configuration interface 501 can include a warning section 518 that indicates whether specific settings from the custom sound presentation instruction console 505 are allowed by specific application providers, game manufacturers, etc. The configuration interface 501 can also include a save control button 519 to save the configurations specified via the configuration interface 501. The configuration interface 501 can also provide a save type control 520 to save the configurations as a custom sound template (e.g., the custom sound template 504) or to stream the custom sound file 515 from a network location.

In some embodiments, the system 500 can provide controls to load or swap sound sets (e.g., the stored sound sets 503) into and out of custom sound templates without having to change event configurations and/or sound presentation instructions. For example, if an operator selected an "Outer Space" themed sound set to replace a "St. Patrick's Day Promotional" sound set, the system could swap all of the custom sounds files (e.g., "win st_pat1.wav," "win st_pat2.wav," "win st_pat3.wav," etc.) from the "St. Patrick's Day Promotional" sound set with custom sound files (e.g., "win_outer_space1.wav," "win_outer_space2.wav," "win_outer_space3.wav," etc.) for the "Outer Space" themed sound set. The sound files from the replacement sound set would relate to the same categories, sub-types, etc., that the replaced sound set related to. More specifically, swapping custom sound sets may include utilizing sets of stored configuration settings associated with the first custom themed sound set (i.e., the St. Patrick's Day themed sound set) and the second custom themed sound set (i.e., the Outer Space themed sound set). In other words, the first custom themed sound set has a first swappable set of stored configuration settings ("first configuration settings") that link specific instructions to specific sound files within the custom sound set. For instance, the "win_st_pat1.wav" file is linked to the sound presentation instruction associated with the event type of "Wins 5000+," as indicated in the criteria 507. The first stored configuration settings, therefore, can include an instruction link that links the "Wins 5000+" criteria to the "win_st_pat1.wav" file, which is part of the first themed custom sound set. The first themed custom sound set can have many different sound files linked to many different types or criteria within the custom sound template 504. Thus, the first configuration settings can have many different instruction-link settings that correspond with the many different types or criteria. The system 500 can be used to create a second set of stored swappable configuration settings ("second configuration settings") that relate to a separate theme (i.e., the Outer Space theme). The second configuration settings can also have multiple instruction-link settings that correlate custom sound files to specific sound instructions for specific types or criteria. An operator can use the system 500 to request a swap of the first themed custom sound set (e.g., a St. Patrick's Day themed sound set) with a second themed custom sound set (e.g., an Outer Space themed sound set). The system 500 can unload the first themed sound set and load the second themed sound set to fit into the sound settings according to the first configuration settings and the second configuration settings. For instance, the Outer Space theme may have been previously configured to link a file (e.g., "win_outer_space1.wav") to the event type of "Wins 5000+" indicated in the criteria 507. The link between the "win_outer_space1.wav" file and the "Wins 5000+" event type were stored in the second configuration settings. As a result, when the system 500 receives a request to swap the first themed sound set with the second themed sound set, the system 500 can refer for the instruction-link setting for the "Wins 5000+" event type in the second configuration settings, and determine that the instruction-link setting was previously associated with the "win_outer_space1.wav" file. The system 500 can then automatically un-associate (e.g., unlink) the "win_st_pat1.wav" file with the "Wins 5000+" event type in the custom sound template 504 and automatically associate (e.g., link or re-link) the "win_outer_space1.wav" file with the "Wins 5000+" event type in the custom sound template 504. Before swapping the first custom sound set with the second custom sound set, the system 500 can store the current instruction-link settings in the first configuration settings. Further, an operation can use the system 500 to access the sound-editing software 532 to replace or modify a custom sound file in a custom sound set (e.g., the operator uses the sound-editing software 532 to replace the "win_st_pat1.wav" file with a different version of the file "win_st_pat1-modified.wav"). As a result, the system 500 can also update the first configuration settings so that the file name for an instruction-link setting is also updated (e.g., the system unlinks the "win_st_pat1.wav" file from its association with the "Wins 5000+" event type and reassigned the "Wins 5000+" event type with the different version of the file "win_st_pat1-modified.wav").

In some embodiments, the system 500 can obtain (e.g., download) and/or provide (e.g., upload) custom sound sets from or to a music server, an online website, etc. In some embodiments, the system can provide an online interface for operators and players to configure custom sounds. Players can customize gaming preferences within parameters set by the casino (e.g., the casino can provide custom sounds based on a theme and a player may only select based on that theme, a player can save custom sounds to a "Favorites" list and may select the favorites as replacement sounds, etc.). Further, the system 500 can include override controls based on themes or types. For example, if a casino is having a special promotion (e.g., a St. Patrick's Day promotion) the system 500 can provide configuration controls so that a casino operator can specify a promotional theme (e.g., Irish melodies and voices) and specify which themes or types will be supplemented or replaced by the promotional theme (e.g., all game types supplemented and/or replaced with Irish tunes and/or voices, only big win types supplemented and/or replaced with Irish tunes and/or voices, etc.).

Figure 6:
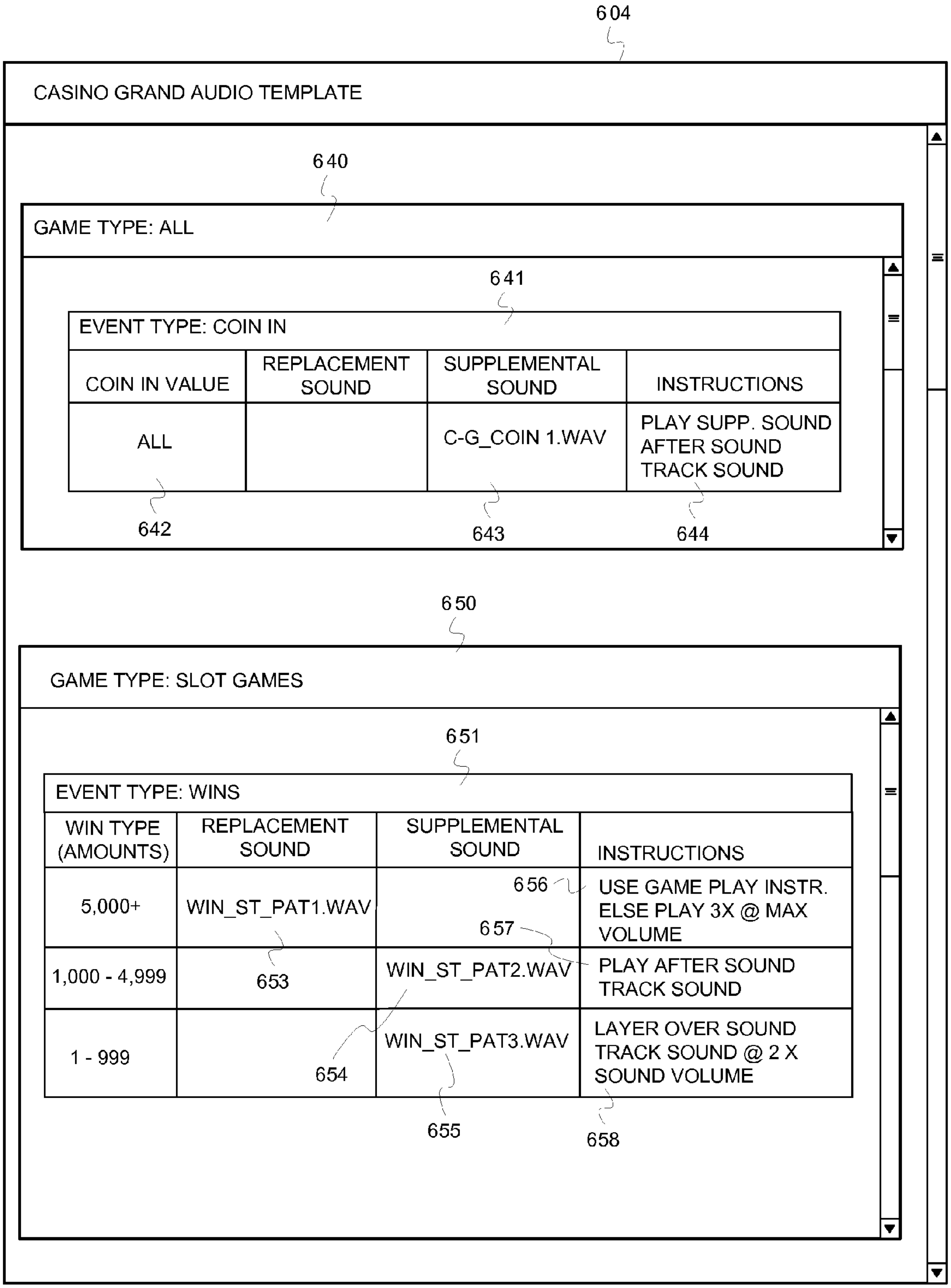
FIG. 6 is an illustration of an example of custom sound template 604, according to some embodiments.

FIG. 6 is an illustration of an example of a custom sound template 604 according to some embodiments. The custom sound template 604 can be an example of the custom sound template 504 generated by the system 500. In FIG. 6, the custom sound template 604 can include multiple configuration sections that relate to different categories, sub-types, etc. For example, a first section 640 can specify first custom sound configurations 641 related to a "coin-in" event generated by all wagering game applications presented on a wagering game machine. For instance, the first custom sound configurations 641 can specify that for all coin-in values 642 a supplemental sound file 643 should be played according to specific sound presentation instructions 644 (i.e., the sound file "c-g_coin1.wav" plays after the wagering game application plays its own coin-in sound). Another section 650 can specify second custom sound configurations 651 related to "win" events for all slot type wagering game applications presented on a wagering game machine. For instance, the second custom sound configurations 651 can indicate that for a win amount of five thousand or more (5,000+) credits (or other unit measurement), a replacement sound file 653 ("win_st_pat1.wav") will play in place of any wagering game application's soundtrack sound that would have played for the win amount (i.e., for a win amount of 5,000+ credits), according to sound presentation instructions 656. For a second win amount of one thousand to four thousand nine hundred and ninety nine (1000-4,999) credits, a supplemental sound file 654 ("win_st_pat2.wav") will play in addition to any wagering game application's soundtrack sound that plays for the win amount (i.e., for a win amount between 1000-4,999 credits), according to sound presentation instructions 657. Further, for a third win amount of one to nine hundred and ninety nine (1-999) credits, a supplemental sound file 655 ("win_st_pat3.wav") will play in addition to any wagering game application's soundtrack sound that plays for the win amount (i.e., for a win amount between 1-999 credits), according to sound presentation instructions 658.

Figure 7:
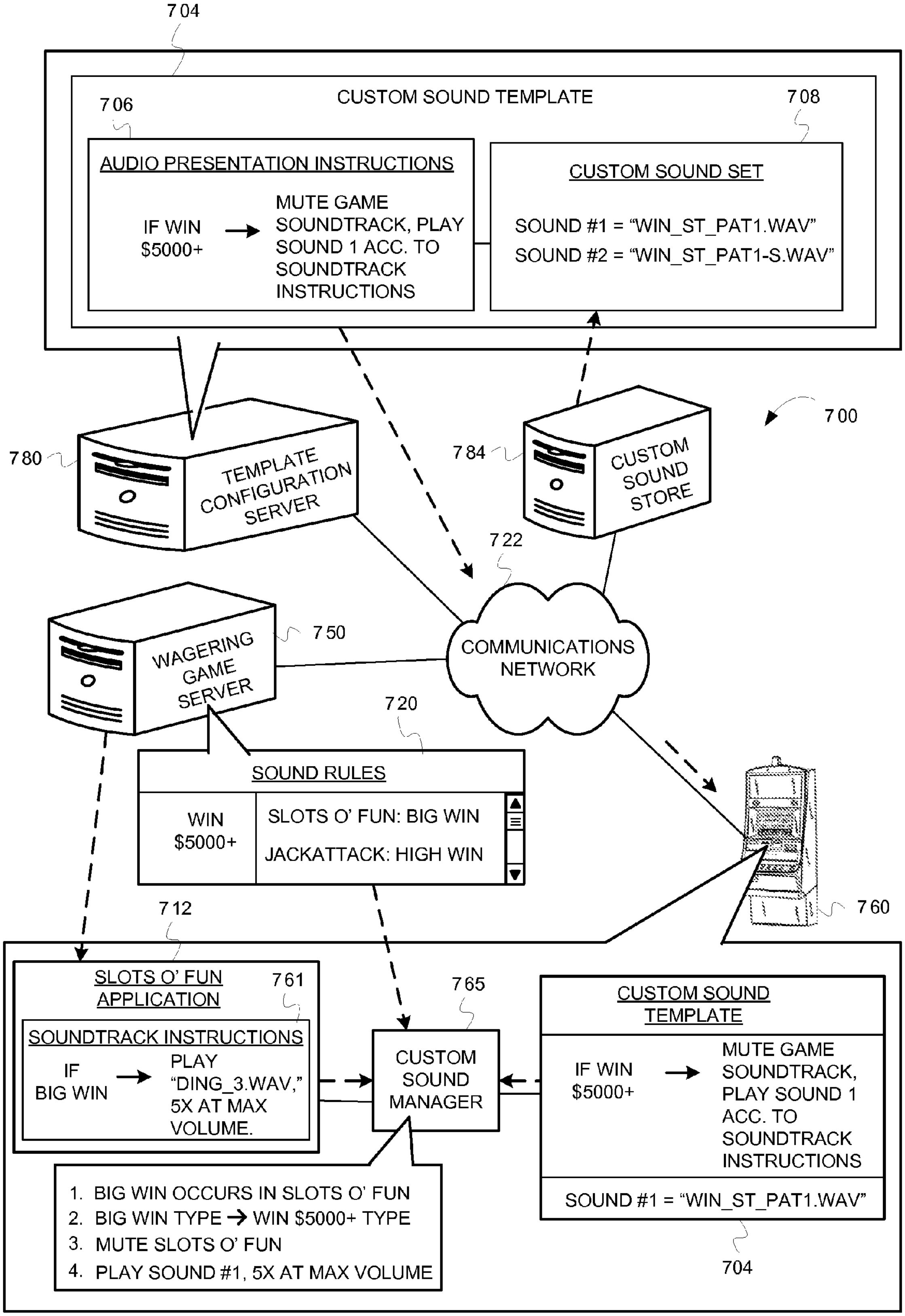
FIG. 7 is an illustration of presenting a custom sound, from a custom sound set, in response to a wagering game event, according to some embodiments.

The flow 300 continues at processing block 306, where the system determines a custom sound, from the custom sound source, that relates to the application event and determines custom-sound play instructions associated with the custom sound. FIG. 7 is an illustration of presenting a custom sound from a custom sound set in response to a wagering game event, according to some embodiments. In FIG. 7, a wagering game system ("system") 700 includes a template configuration server 780, a custom sound store 784, a wagering game server 750, and a wagering game machine 760 connected via a communications network 722. The wagering game machine 760 can run a wagering game application 712 (e.g., the wagering game application 412 "Slots O' Fun" in FIG. 4). The template configuration server 780 can generate a custom sound template 704 and transfer it to the wagering game machine 760. The template configuration server 780 can also generate custom sound rules 720 and store them on the wagering game server 750. The custom sound template 704 can include custom sound presentation instructions 706 and a set of custom sounds ("custom sound set") 708. The custom sound presentation instructions 706 include instructions and logic related to the presentation of custom sounds from the custom sound set 708 in place of, or supplemental to, sounds from the wagering game application 712. The wagering game application 712 can include soundtrack sound presentation instructions ("soundtrack instructions") that specify programmed sounds to play under certain conditions or for certain wagering game events. In other words, the wagering game application 712 may produce a gaming event that has been pre-coded with a specific event type. For instance, the wagering game application 712 has code, settings, configurations, etc., that can specify a gaming win event that can be classified as a "Big Win" event type (e.g., a royal flush, a black-jack, a progressive jackpot hit, a high-paying reel combination, etc.), as described previously in FIG. 4. The system 700, however, can include a sound manager 765, on the wagering game machine 760, which detects the "Big Win" event and determines a custom sound from the custom sound template 704, which relates to the application event. In some embodiments, the sound manager 765 can determine custom sounds and custom-sound play instructions by referring to the custom sound rules 720 stored on a rules store (e.g., on the wagering game server 750).

Specifically, the sound manager 765 determines a custom sound event type or condition related to the custom sound template 704 and determines an association with a gaming application type or condition. The gaming application types and conditions and the custom sound event types and conditions can be pre-programmed into the custom sound rules 720, and can relate to player-related conditions, player types (e.g., carded players, VIP players, players that have reached certain status or loyalty levels, etc.), player audio preferences, time of day, date of the year, game priorities, machine locations, player locations, analytics, player inputs, game related activities (e.g., wins, losses, bets, coin-in, bonus games, game themes, thresholds, etc.), promotional events, prize types, marketing, popular sounds, mystery events, maintenance needs, etc.

More specifically, the sound manager 765 can detect the "Big Win" event by determining an amount of money associated with the Big Win. For instance, referring momentarily back to FIG. 4, a Big Win event occurred in the amount of five thousand three hundred thirty four (5354) credits. The sound manager 765 can consult with the wagering game server 750 to reference the custom sound rules 720. The custom sound rules 720 indicate that certain events for certain wagering game applications, including the wagering game application 712, fit into certain general categories or types for the custom sound template 704. For example, the custom sound template 704 can specify for a win event type that is five thousand credits or more credits (a "5,000+ Win" event), the sound manager 765 should mute the soundtrack sound and play a replacement sound (i.e., sound file #1, or "win_st_pat1.wav"). The sound manager 765 can consult the sound rules to determine that for the wagering game application 712 (i.e., the Slots O' Fun game application) a Big Win event fits within, or is equivalent to, the 5,000+ Win event used by the custom sound template 704. In some embodiments, the custom sound rules 720 can instead, or also, be stored in the custom sound template 704, on the wagering game machine 760, or in other locations. The sound manager 765 can also determine custom-sound play instructions, or more specifically, the custom sound presentation instructions 706 from the custom sound template 704. The custom sound presentation instructions 706 for a 5,000+ Win event indicates that the sound manager 765 should play sound file #1 according to soundtrack instructions 761. In other words, the soundtrack instructions 761 says to play the "ding_3.wav" sound file five times at maximum volume.

The flow 300 continues at processing block 308, where the system presents the custom sound on the wagering game machine during the application event according to the custom-sound play instructions. In some embodiments, the system can determine and present the custom sound based on application event type. For example, the system can determine an application-event type for the application event and determine a custom-sound type, stored in the custom sound source, which corresponds to the event type. Further, the system can determine a custom sound file associated with the custom-sound type and present the custom sound file during the application event. In some embodiments, the system can present the custom sound using sound-track presentation parameters for the application sound. For example, the system can determine an application sound on the soundtrack for the application event, determine sound-track presentation instructions associated with the application sound, and determine presentation parameters indicated in the soundtrack presentation instructions that specifically relate to the presentation of the application sound during the application event. Further, the system can incorporate the presentation parameters with the custom-sound presentation instructions (e.g., pass the presentation parameters to custom-sound presentation functions included in the custom-sound play instructions), and present the custom sound according to the custom-sound presentation parameters. For example, in FIG. 7, as stated above, the sound manager 765 determines that it should play sound file #1 in place of the "ding_3.wav" sound file. The sound manager 765 can mute the "ding_3.wav" game sound presentation, and present the "win_st_pat1.wav" sound file in its place. The sound manager 765 can use the soundtrack instructions to play the sound file five times at maximum volume. In other words, the sound manager 765 presents sound file #1 in place of the game sound using the same sound presentation instructions that the wagering game application 712 would have used to play the game sound.

Returning to FIG. 3, in some embodiments, the system can replace the application sound with the custom sound according to a scheduled duration parameter for the application sound. The system can determine a custom sound replacement instruction to replace the application sound, determine a scheduled duration for the application sound during the application event, mute the application sound for the scheduled duration, and present the custom sound in place of the application sound for the schedule duration. The system can determine a duration value stored in soundtrack instructions for the application sound. In some embodiments, the system can dynamically modify the custom sound to prevent sound conflicts with an additional application sound. For example, the system can determine an occurrence of an additional application event. The application can schedule to present an additional application sound associated with the additional application event. The system, however, can determine that the custom sound will conflict with the schedule presentation of the additional application sound. The system can, therefore, dynamically modify presentation of the custom sound during the wagering game session to prevent conflict with the additional application sound. In some embodiments, the system can dynamically modify characteristics of the custom sound to complete presentation before a scheduled starting time for the additional application sound. For example, the system can determine a first scheduled duration for the presentation of a first application sound for the first application event and then determine an occurrence of the additional application event, which is scheduled to present the additional application sound after the first scheduled duration of the first application sound. The system can determine a second scheduled duration for the custom sound, and determine that the second scheduled duration is longer than the first scheduled duration and extends past the scheduled starting time for the additional application sound. In other words, the system determines that the presentation of the custom sound would interfere with the presentation of the additional application sound. The system can then dynamically modify characteristics of the custom sound to complete presentation before the scheduled starting time for the additional application sound. As examples, the system can dynamically modify characteristics of the custom sound so the custom sound can complete before the scheduled starting time by speeding up the presentation of the custom sound, playing fewer scheduled repetitions of the custom sound, or fading the volume of the custom sound. In other embodiments, the system can dynamically modify characteristics of the additional sound (e.g., dip volume at a beginning of the additional sound and increase the volume to a normal level after the custom sound finishes playing, mute the additional sound, delay the starting time for the additional sound, etc.). In some embodiments, the system can also cancel the presentation of the custom sound.

In some embodiments, the system can dynamically modify the custom sound according to a themed sound indicator. For example, the system can determine voice files associated with the application event, determine a theme type for the custom sound, and modify presentation of voice files to match the theme type. (e.g., St. Patrick's Day theme where the system modifies voice-file characteristics or settings to sound like Irish voices (e.g., dynamically changes a voice accent parameter to an "Irish" setting). In some embodiments, the system can supplement the custom sound with the application sound and dynamically balance their audio levels using typing and priority rules. The balancing can prevent clipping of overlapping sounds. In some embodiments, the system can override some priorities based on custom sound rules and custom sound presentation instructions.

The flow 300 continues at processing block 310, where the system presents the custom sound in targeted areas of a casino floor. In some embodiments, the system can determine locations of the casino floor where the custom sound can be presented according to marketing settings, and present the custom sound on additional wagering game machines or in association with other devices in the locations of the casino floor. In some embodiments, the system can target, or focus, the custom sounds on peripherals and machine banks at other locations. In some embodiments, the system can target the custom sound to locations of player's friends on a casino floor. In some embodiments, the system can capture one custom sound in one part of the casino and repeat it in another part of the casino. In some embodiments, the system can target or focus custom sound to speakers near a manufacturer's machine that will not allow customized sounds. In some embodiments, the system can target custom sounds from wagering games to peripheral audio delivery systems for specific banks of machines. For instance, the system can customize music and sounds tied to game play and present the custom sounds for separate bank areas on speakers for wagering game machines in the bank areas and on speakers associated with peripheral audio delivery systems assigned to the bank areas.

Additional Example Operating Environments

This section describes example operating environments, systems and networks, and presents structural aspects of some embodiments.

Wagering Game Machine Architecture

Figure 8:
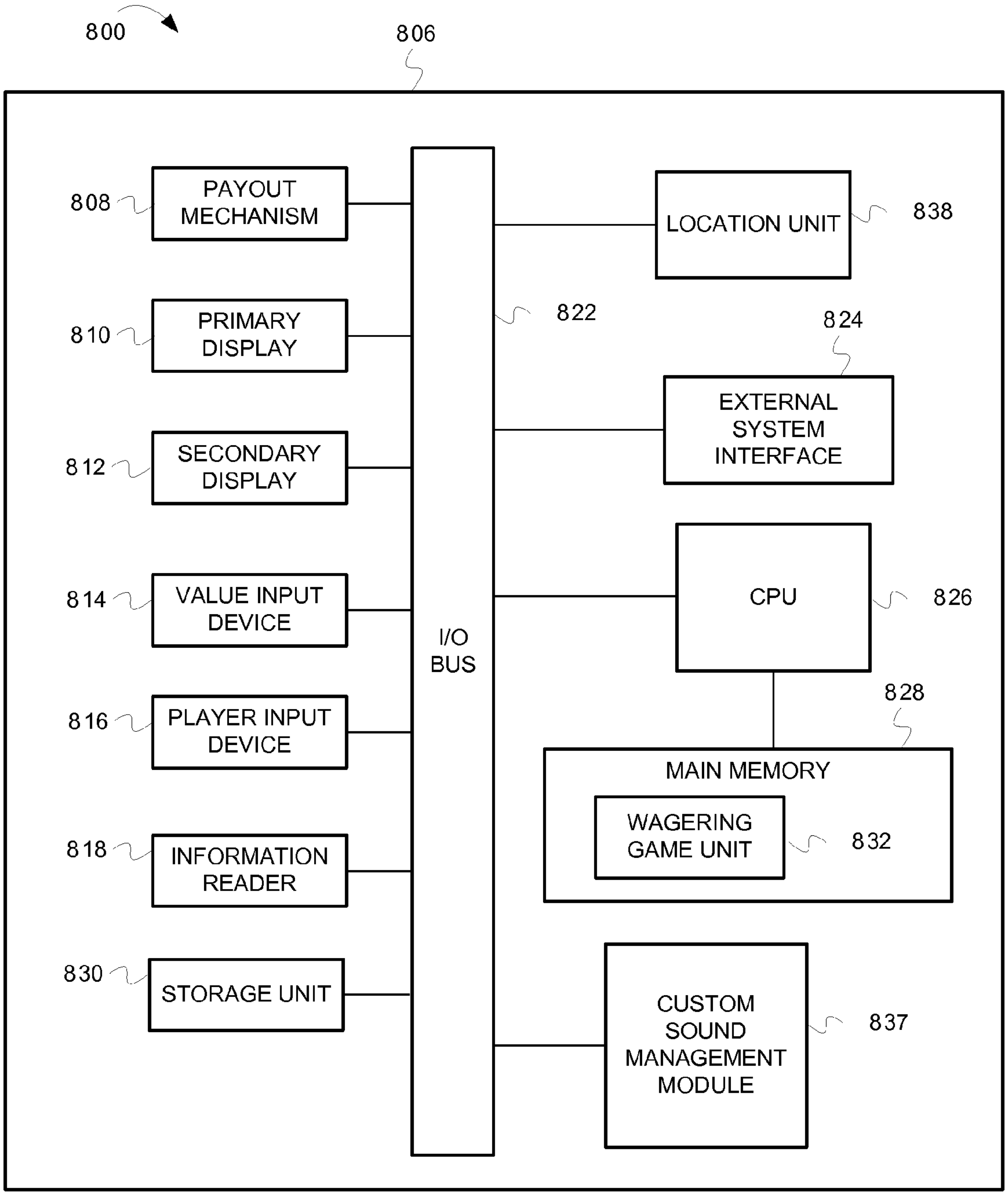
FIG. 8 is an illustration of a wagering game machine architecture 800, according to some embodiments.

FIG. 8 is a conceptual diagram that illustrates an example of a wagering game machine architecture 800, according to some embodiments. In FIG. 8, the wagering game machine architecture 800 includes a wagering game machine 806, which includes a central processing unit (CPU) 826 connected to main memory 828. The CPU 826 can include any suitable processor, such as an Intel® Pentium processor, Intel® Core 2 Duo processor, AMD Opteron™ processor, or UltraSPARC processor. The main memory 828 includes a wagering game unit 832. In some embodiments, the wagering game unit 832 can present wagering games, such as video poker, video black jack, video slots, video lottery, reel slots, etc., in whole or part.

The CPU 826 is also connected to an input/output ("I/O") bus 822, which can include any suitable bus technologies, such as an AGTL+ frontside bus and a PCI backside bus. The I/O bus 822 is connected to a payout mechanism 808, primary display 810, secondary display 812, value input device 814, player input device 816, information reader 818, and storage unit 830. The player input device 816 can include the value input device 814 to the extent the player input device 816 is used to place wagers. The I/O bus 822 is also connected to an external system interface 824, which is connected to external systems (e.g., wagering game networks). The external system interface 824 can include logic for exchanging information over wired and wireless networks (e.g., 802.11g transceiver, Bluetooth transceiver, Ethernet transceiver, etc.)

The I/O bus 822 is also connected to a location unit 838. The location unit 838 can create player information that indicates the wagering game machine's location/movements in a casino. In some embodiments, the location unit 838 includes a global positioning system (GPS) receiver that can determine the wagering game machine's location using GPS satellites. In other embodiments, the location unit 838 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 8, in some embodiments, the location unit 838 is not connected to the I/O bus 822.

In some embodiments, the wagering game machine 806 can include additional peripheral devices and/or more than one of each component shown in FIG. 8. For example, in some embodiments, the wagering game machine 806 can include multiple external system interfaces 824 and/or multiple CPUs 826. In some embodiments, any of the components can be integrated or subdivided.

In some embodiments, the wagering game machine 806 includes a custom sound management module 837. The custom sound management module 837 can process communications, commands, or other information, where the processing can configure and control wagering game audio.

Furthermore, any component of the wagering game machine 806 can include hardware, firmware, and/or machine-readable storage media including instructions for performing the operations described herein.

Mobile Wagering Game Machine

Figure 9:
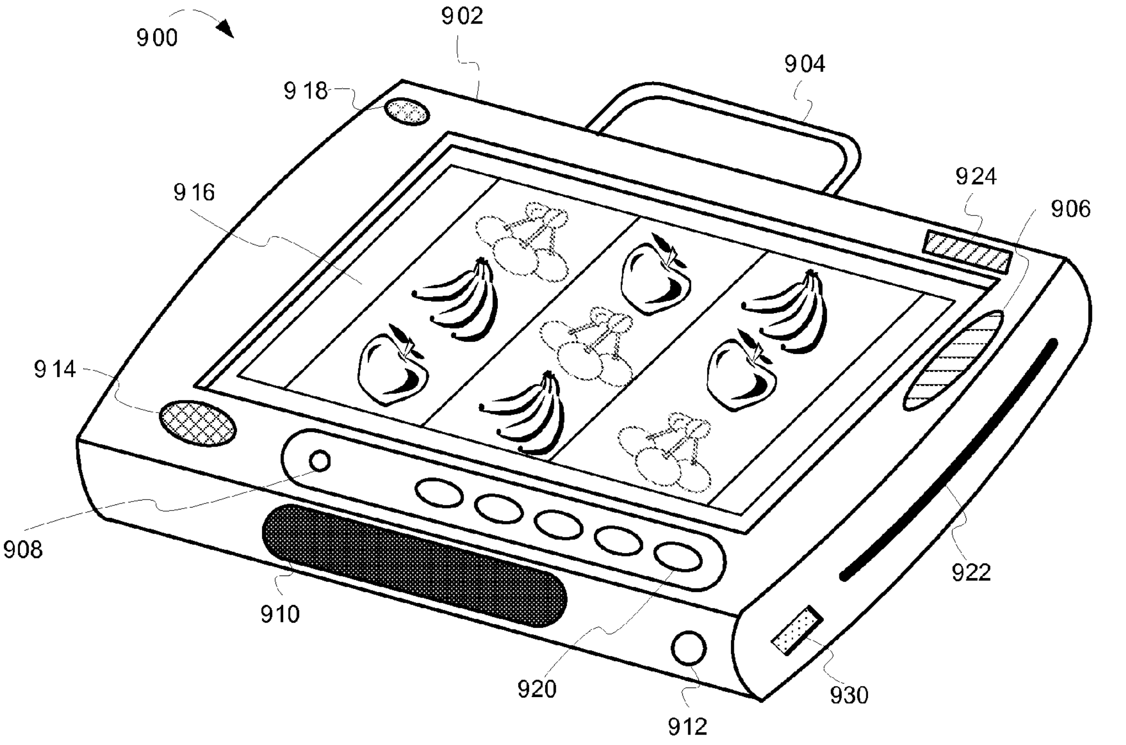
FIG. 9 is an illustration of a mobile wagering game machine 900, according to some embodiments.

FIG. 9 is a conceptual diagram that illustrates an example of a mobile wagering game machine 900, according to some embodiments. In FIG. 9, the mobile wagering game machine 900 includes a housing 902 for containing internal hardware and/or software such as that described above vis-à-vis FIG. 8. In some embodiments, the housing has a form factor similar to a tablet PC, while other embodiments have different form factors. For example, the mobile wagering game machine 900 can exhibit smaller form factors, similar to those associated with personal digital assistants. In some embodiments, a handle 904 is attached to the housing 902. Additionally, the housing can store a foldout stand 910, which can hold the mobile wagering game machine 900 upright or semi-upright on a table or other flat surface.

The mobile wagering game machine 900 includes several input/output devices. In particular, the mobile wagering game machine 900 includes buttons 920, audio jack 908, speaker 914, display 916, biometric device 906, wireless transmission devices (e.g., wireless communication units 912 and 924), microphone 918, and card reader 922. Additionally, the mobile wagering game machine can include tilt, orientation, ambient light, or other environmental sensors.

In some embodiments, the mobile wagering game machine 900 uses the biometric device 906 for authenticating players, whereas it uses the display 916 and the speaker 914 for presenting wagering game results and other information (e.g., credits, progressive jackpots, etc.). The mobile wagering game machine 900 can also present audio through the audio jack 908 or through a wireless link such as Bluetooth.

In some embodiments, the wireless communication unit 912 can include infrared wireless communications technology for receiving wagering game content while docked in a wager gaming station. The wireless communication unit 924 can include an 802.11G transceiver for connecting to and exchanging information with wireless access points. The wireless communication unit 924 can include a Bluetooth transceiver for exchanging information with other Bluetooth enabled devices.

In some embodiments, the mobile wagering game machine 900 is constructed from damage resistant materials, such as polymer plastics. Portions of the mobile wagering game machine 900 can be constructed from non-porous plastics, which exhibit antimicrobial qualities. Also, the mobile wagering game machine 900 can be liquid resistant for easy cleaning and sanitization.

In some embodiments, the mobile wagering game machine 900 can also include an input/output ("I/O") port 930 for connecting directly to another device, such as to a peripheral device, a secondary mobile machine, etc. Furthermore, any component of the mobile wagering game machine 900 can include hardware, firmware, and/or machine-readable storage media including instructions for performing the operations described herein.

Wagering Game Machine

Figure 10:
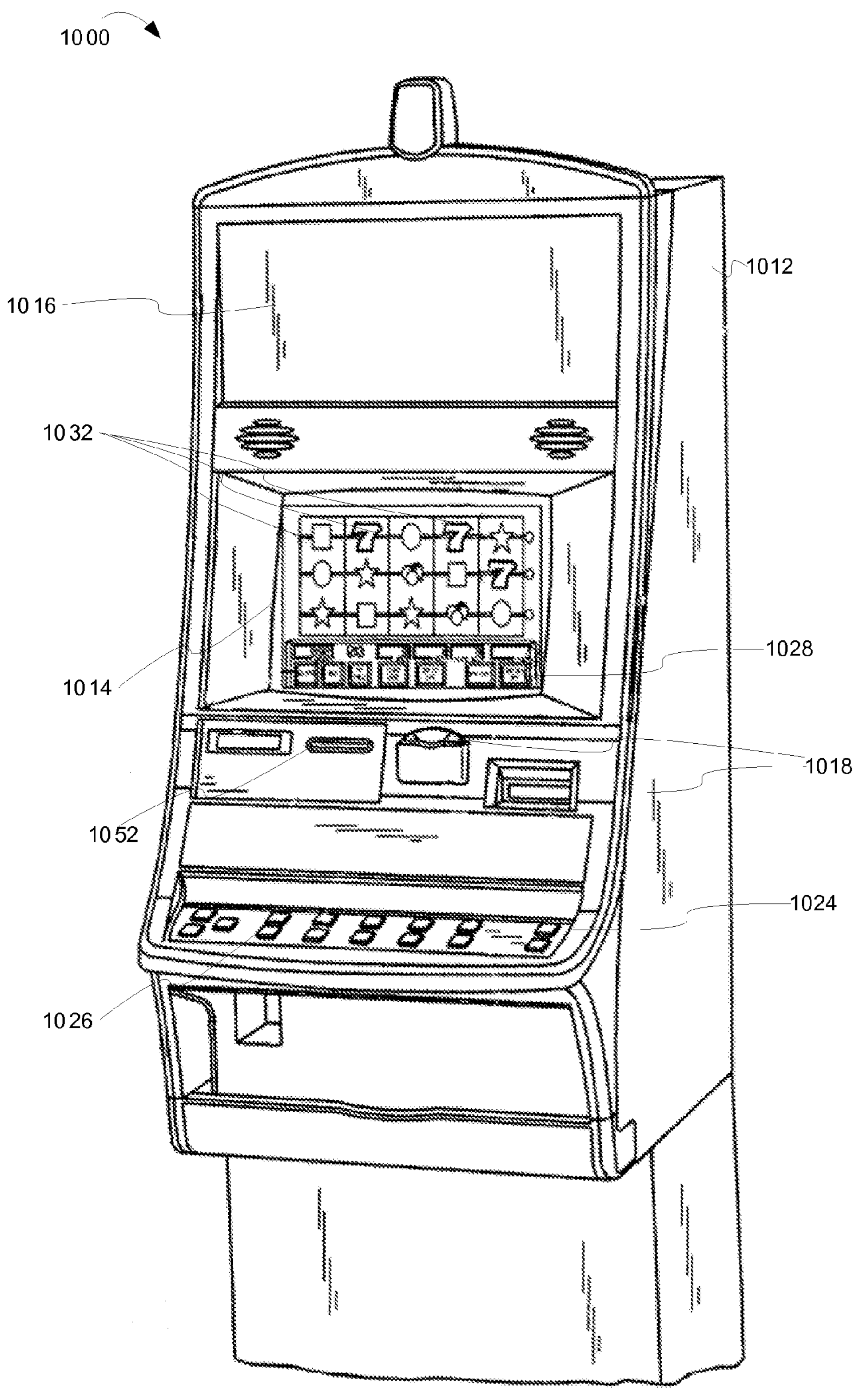
FIG. 10 is an illustration of a wagering game machine 1000, according to some embodiments.

FIG. 10 is a conceptual diagram that illustrates an example of a wagering game machine 1000, according to some embodiments. Referring to FIG. 10, the wagering game machine 1000 can be used in gaming establishments, such as casinos. According to some embodiments, the wagering game machine 1000 can be any type of wagering game machine and can have varying structures and methods of operation. For example, the wagering game machine 1000 can be an electromechanical wagering game machine configured to play mechanical slots, or it can be an electronic wagering game machine configured to play video casino games, such as blackjack, slots, keno, poker, blackjack, roulette, etc.

The wagering game machine 1000 comprises a housing 1012 and includes input devices, including value input devices 1018 and a player input device 1024. For output, the wagering game machine 1000 includes a primary display 1014 for displaying information about a basic wagering game. The primary display 1014 can also display information about a bonus wagering game and a progressive wagering game. The wagering game machine 1000 also includes a secondary display 1016 for displaying wagering game events, wagering game outcomes, and/or signage information. While some components of the wagering game machine 1000 are described herein, numerous other elements can exist and can be used in any number or combination to create varying forms of the wagering game machine 1000.

The value input devices 1018 can take any suitable form and can be located on the front of the housing 1012. The value input devices 1018 can receive currency and/or credits inserted by a player. The value input devices 1018 can include coin acceptors for receiving coin currency and bill acceptors for receiving paper currency. Furthermore, the value input devices 1018 can include ticket readers or barcode scanners for reading information stored on vouchers, cards, or other tangible portable storage devices. The vouchers or cards can authorize access to central accounts, which can transfer money to the wagering game machine 1000.

The player input device 1024 comprises a plurality of push buttons on a button panel 1026 for operating the wagering game machine 1000. In addition, or alternatively, the player input device 1024 can comprise a touch screen 1028 mounted over the primary display 1014 and/or secondary display 1016.

The various components of the wagering game machine 1000 can be connected directly to, or contained within, the housing 1012. Alternatively, some of the wagering game machine's components can be located outside of the housing 1012, while being communicatively coupled with the wagering game machine 1000 using any suitable wired or wireless communication technology.

The operation of the basic wagering game can be displayed to the player on the primary display 1014. The primary display 1014 can also display a bonus game associated with the basic wagering game. The primary display 1014 can include a cathode ray tube (CRT), a high resolution liquid crystal display (LCD), a plasma display, light emitting diodes (LEDs), or any other type of display suitable for use in the wagering game machine 1000. Alternatively, the primary display 1014 can include a number of mechanical reels to display the outcome. In FIG. 10, the wagering game machine 1000 is an "upright" version in which the primary display 1014 is oriented vertically relative to the player. Alternatively, the wagering game machine can be a "slant-top" version in which the primary display 1014 is slanted at about a thirty-degree angle toward the player of the wagering game machine 1000. In yet another embodiment, the wagering game machine 1000 can exhibit any suitable form factor, such as a free standing model, bar top model, mobile handheld model, or workstation console model.

A player begins playing a basic wagering game by making a wager via the value input device 1018. The player can initiate play by using the player input device's buttons or touch screen 1028. The basic game can include arranging a plurality of symbols along a pay line 1032, which indicates one or more outcomes of the basic game. Such outcomes can be randomly selected in response to player input. At least one of the outcomes, which can include any variation or combination of symbols, can trigger a bonus game.

In some embodiments, the wagering game machine 1000 can also include an information reader 1052, which can include a card reader, ticket reader, bar code scanner, RFID transceiver, or computer readable storage medium interface. In some embodiments, the information reader 1052 can be used to award complimentary services, restore game assets, track player habits, etc.

The described embodiments may be provided as a computer program product, or software, that may include a machine-readable storage medium having stored thereon instructions, which may be used to program a computer system (or other electronic device(s)) to perform a process according to embodiments(s), whether presently described or not, because every conceivable variation is not enumerated herein. A machine-readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, in some embodiments machine-readable signal media may include an electrical, optical, acoustical or other form of propagated signal (e.g., carrier waves, infrared signals, digital signals, etc.).

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A computer-implemented method comprising:

presenting a custom sound design interface;

receiving user input from a casino attendant via the custom sound design interface, wherein the user input is to design a custom sound including presentation instructions for the custom sound;

storing the custom sound;

determining an occurrence of an application event for an application that runs in association with a wagering game machine;

determining that the custom sound relates to the application event;

determining the presentation instructions for the custom sound; and presenting the custom sound on a sound production device associated with the wagering game machine during the application event according to the custom-sound presentation instructions.

2. The computer-implemented method of claim 1, wherein presenting the custom sound comprises one of replacing a sound effect for the application event with the custom sound and supplementing a sound effect for the application event with the custom sound.

3. The computer-implemented method of claim 1, wherein the custom sound is stored in a custom sound source that includes one or more of a custom sound template stored on the wagering game machine and a network-accessible custom sound store.

4. The computer-implemented method of claim 1, wherein determining that the custom sound relates to the application event comprises:

determining an application event type for the application event;

determining a custom-sound type, stored in the custom sound source, that corresponds to the application event type;

determining a custom sound file associated with the custom-sound type.

5. The computer-implemented method of claim 1 further comprising presenting the custom sound using sound-track presentation parameters for an application sound.

6. The computer-implemented method of claim 1 further comprising:

dynamically modifying the custom sound to prevent sound conflicts with a second application sound.

7. One or more machine-readable storage media having instructions stored thereon, which when executed by a set of one or more processors causes the set of one or more processors to perform operations comprising:

presenting a custom sound design interface;

receiving user input from a casino attendant via the custom sound design interface, wherein the user input is to design a custom sound including presentation instructions for the custom sound;

storing the custom sound in a custom sound source;

determining an occurrence of an application event for an application that runs in association with a wagering game machine;

accessing the custom sound source, wherein the custom sound source includes customized sounds presentable along with a soundtrack for the application, during a wagering game session on the wagering game machine;

determining that the custom sound, from the custom sound source, relates to the application event;

determining the presentation instructions for the custom sound;

determining an application sound on the soundtrack for the application event;

determining sound-track presentation instructions associated with the application sound;

determining presentation parameters indicated in the soundtrack presentation instructions that specifically relate to the presentation of the application sound during the application event;

incorporating the presentation parameters with the presentation instructions for the custom sound; and presenting the custom sound according to the presentation instructions for the custom sound during the application event.

8. The one or more machine-readable storage media of claim 7, wherein the operation for incorporating the presentation parameters with the presentation instructions for the custom sound includes operations further comprising passing the presentation parameters to custom-sound presentation functions included in the custom sound presentation instructions for the custom sound.

9. The one or more machine-readable storage media of claim 7 said operations further comprising replacing the application sound with the custom sound according to a scheduled duration parameter for the application sound.

10. The one or more machine-readable storage media of claim 7 said operations further comprising:

determining a custom sound replacement instruction to replace the application sound;

determining a scheduled duration for the application sound during the application event;

muting the application sound for the scheduled duration; and presenting the custom sound in place of the application sound for the scheduled duration.

11. The one or more machine-readable storage media of claim 10, wherein the operation for determining the scheduled duration includes operations further comprising determining a duration value stored in soundtrack instructions for the application sound and determining the schedule duration based on the duration value.

12. A system comprising:

a content controller configured to provide wagering game content for a wagering game application, wherein the wagering game content includes audio content for the wagering game application, and provide an application event related to the wagering game content; and a custom sound manager configured to present a custom sound design interface, receive user input from a casino attendant via the custom sound design interface, wherein the user input is to design a custom sound file including presentation instructions for the custom sound file, store the custom sound file in a custom sound set, determine an application-defined event type associated with the application event, determine a custom-defined event type that corresponds to the application-defined event type, determine that the at least one custom sound file, from the custom sound set, corresponds the custom-defined event type, determine at least one presentation instruction for the custom sound file, from the presentation instructions for the custom sound file, that corresponds with the custom-defined event type, and control the audio content from the wagering game content using the at least one custom sound file and the at least one presentation instruction for the custom sound file.

13. The system of claim 12, wherein the custom sound manager is further configured to refer to custom sound rules, and determine from the custom sound rules that the custom-defined event type corresponds to the application-defined event type.

14. The system of claim 12, where the custom sound manager is further configured to receive custom sounds and the custom sound presentation instructions from one or more of a custom sound template stored on a wagering game machine and a custom sound storage device accessible via a wagering game network.

15. The system of claim 12, wherein the custom sound manager is further configured to determine application soundtrack presentation instructions for the audio content, determine at least one presentation parameter indicated in the application soundtrack presentation instructions that specifically relates to the presentation of the audio content during the application event, incorporate the at least one presentation parameter into the at least one presentation instruction for the custom sound file, and present the at least one custom sound file, according to the presentation instructions for the custom sound file and the at least one presentation parameter, during the application event.

16. The system of claim 12, wherein the wagering game server is further configured to determine locations of the casino floor where the custom sound file can be presented according to marketing settings, and target presentation of the custom sound file on one or more wagering game machines in the locations of the casino floor, one or more peripheral devices associated with a wagering game machine in the locations of the casino floor, and an audio delivery system associated with a casino network in the locations of the casino floor.

17. An apparatus comprising:

a processor; and a template configuration controller configured to, via the processor, generate a custom sound template configured to provide custom sounds to present in association with a wagering game machine in response to wagering game application events, associate a first themed custom sound set with custom sound presentation instructions on the custom sound template, wherein the first themed custom sound set includes first custom sound files of a first theme, wherein one or more of the first custom sound files are linked with one or more of the custom sound presentation instructions according to a first configuration setting, determine a request to swap the first themed custom sound set with a second themed custom sound set, wherein the second themed custom sound set includes second custom sound files of a second theme, wherein the second theme and the first theme are different themes from each other, and wherein one or more of the second custom sound files were previously associated with the one or more of the custom sound presentation instructions according to a second configuration setting, automatically unlink the one or more first custom sound files from the one or more of the custom sound presentation instructions, and automatically link the one or more second custom sound files to the one or more first custom sound files according to pre-stored link settings stored in the second configuration setting.

18. The apparatus of claim 17, wherein the template configuration controller is further configured to automatically save the first configuration setting to store instruction-link settings between the one or more of the first custom sound files and the one or more of the custom sound presentation instructions.

19. The apparatus of claim 17, wherein the template configuration controller is further configured to replace a first sound file from the first custom sound files with a second sound file, remove an instruction-link setting for the first sound file, and assign the instruction-link setting to the second sound file.

20. An apparatus comprising:

means for receiving user input from a casino attendant to design a custom sound including presentation instructions for the custom sound;

means for storing the custom sound in a custom sound source means for determining an occurrence of an application event for an application that runs in association with a wagering game machine;

means for accessing the custom sound source that includes customized sounds presentable separately from a soundtrack for the application, during a wagering game session on the wagering game machine;

means for determining a custom sound, from the custom sound source, that relates to the application event;

means for determining presentation instructions for the custom sound associated with the custom sound;

means for determining an occurrence of an additional application event, wherein the application is scheduled to present an additional application sound associated with the additional application event;

means for determining that presentation of the custom sound will conflict with presentation of the additional application sound; and means for dynamically modifying presentation of the custom sound to prevent conflict with the additional application sound.

21. The apparatus of claim 20, wherein the means for dynamically modifying the custom sound presentations comprises means for modifying characteristics of the custom sound to complete presentation before a scheduled starting time for the additional application sound.

22. The apparatus of claim 20, wherein dynamically modifying the custom sound presentations comprises means for determining a first scheduled duration for the presentation of the application sound for the application event, means for determining an occurrence of an additional application event, wherein the application is scheduled to present an additional application sound after the first scheduled duration of the application sound, means for determining a second scheduled duration for the custom sound, means for determining that the second scheduled duration is longer than the first scheduled duration and extends past a scheduled starting time for the additional application sound such that the presentation of the custom sound would interfere with the presentation of the additional application sound, and means for dynamically modifying characteristics of the custom sound to complete presentation before the scheduled starting time for the additional application sound.

23. The apparatus of claim 22, wherein the means for dynamically modifying characteristics of the custom sound comprises one or more of means for speeding up the presentation of the custom sound to complete before the scheduled starting time, means for playing fewer scheduled repetitions of the custom sound to complete before the scheduled starting time, and means for fading the volume of the custom sound to complete before the scheduled starting time.

24. The apparatus of claim 20 further comprising:

means for dynamically modifying characteristics of the additional sound comprising one or more of means for decreasing a volume for the additional sound at a scheduled starting time of the additional sound and increasing the volume to a default level after presentation of the custom sound finishes, means for muting the additional sound, and means for delaying the scheduled starting time for the additional sound.

25. The apparatus of claim 20, wherein dynamically modifying the custom sound presentations comprises cancelling the presentation of the custom sound.

* * * * *